(12) United States Patent
Fujita

(10) Patent No.: US 7,103,961 B2
(45) Date of Patent: Sep. 12, 2006

(54) PRODUCTION METHOD OF AMORPHOUS LAMINATE CORE AND AMORPHOUS LAMINATE CORE

(75) Inventor: Katsufusa Fujita, Fukuoka (JP)

(73) Assignee: Mitsui High-tec, Inc., (JP)

( * ) Notice: Subject to any disclaimer, the term of this patent is extended or adjusted under 35 U.S.C. 154(b) by 197 days.

(21) Appl. No.: 10/482,861

(22) PCT Filed: Jan. 9, 2003

(86) PCT No.: PCT/JP03/00108

§ 371 (c)(1),
(2), (4) Date: Jan. 5, 2004

(87) PCT Pub. No.: WO03/061101

PCT Pub. Date: Jul. 24, 2003

(65) Prior Publication Data

US 2004/0164837 A1    Aug. 26, 2004

(30) Foreign Application Priority Data

Jan. 17, 2002    (JP) ............................. 2002-009213

(51) Int. Cl.
*B21D 39/00* (2006.01)
*B23P 11/00* (2006.01)
*B23P 19/02* (2006.01)
*H01F 3/04* (2006.01)
*H01F 7/06* (2006.01)
*H02K 1/06* (2006.01)
*H02K 15/02* (2006.01)

(52) U.S. Cl. .......................... 29/596; 29/521; 29/524; 29/525; 29/598; 29/607; 29/609; 29/738; 29/904; 310/216; 310/217

(58) Field of Classification Search ............... 29/596, 29/598, 607, 609, DIG. 40, 521, 524, 525, 29/738; 310/216, 217; 156/196, 513
See application file for complete search history.

(56) References Cited

U.S. PATENT DOCUMENTS

| | | | | |
|---|---|---|---|---|
| 1,158,463 A * | 11/1915 | Eaton | ............................ | 29/598 |
| 2,172,191 A * | 9/1939 | Denman | ...................... | 310/259 |
| 3,423,814 A * | 1/1969 | Davis | ........................... | 29/738 |
| 3,597,835 A * | 8/1971 | Scaillet et al. | ................ | 29/598 |
| 4,578,853 A * | 4/1986 | Wurth | .......................... | 29/598 |
| 5,666,015 A * | 9/1997 | Uchibori et al. | ............. | 310/261 |
| 5,894,654 A * | 4/1999 | Varis et al. | ................... | 29/598 |
| 6,047,460 A * | 4/2000 | Nagate et al. | ................ | 29/598 |
| 6,769,167 B1 * | 8/2004 | Lee et al. | ..................... | 29/596 |

FOREIGN PATENT DOCUMENTS

| | | |
|---|---|---|
| EP | 1 001 302 A1 | 5/2000 |
| JP | 5-109454 | 4/1993 |
| JP | 9-215279 | 8/1997 |
| JP | 9-308192 | 11/1997 |
| JP | 411333528 A * | 7/1999 |
| JP | 2001-45684 | 2/2001 |
| JP | 2001-57747 | 2/2001 |
| JP | 2002-10543 | 1/2002 |

\* cited by examiner

*Primary Examiner*—Peter Vo
*Assistant Examiner*—Livius Radu Cazan
(74) *Attorney, Agent, or Firm*—Wood, Phillips, Katz, Clark & Mortimer

(57) ABSTRACT

An amorphous laminated core and a method of making an amorphous laminated core by punching core pieces from amorphous thin sheet material, laminating the plural sheets of core pieces, and forming caulking through-holes by punching. Rod shaped materials are directed into the caulking through-holes of the laminated core pieces.

4 Claims, 2 Drawing Sheets

PUSH-BACK

PRODUCTION METHOD OF AMORPHOUS LAMINATE CORE AND AMORPHOUS LAMINATE CORE

TECHNICAL FIELD OF THE INVENTION

This invention relates to a core used, as in a motor, and in particular, to a method of manufacturing a laminated core by laminating core pieces punched out from an amorphous thin sheet material, and to an amorphous laminated core.

BACKGROUND OF THE INVENTION

It has recently been proposed to use amorphous materials having high permeability and less iron loss in cores for heightening efficiency of motors and saving energy.

A core employing the amorphous material is, as seen in Japanese Patent Publication Hei-5-109545/(1993), alternately laminated with oriented silicon steel sheets and the amorphous materials, with a laminated core component mechanically connected by caulking.

Japanese Patent Publication Hei-9-215279/(1997) discloses use of projections and through-holes as a caulking means for a laminated core.

Since the composing material, especially, the amorphous material, has high brittleness and it itself is very thin, the production does not depend on punching out one sheet at a time but depends on steps of laminating the plural amorphous thin sheets unified in one component using adhesives, followed by integrally punching the caulking through-holes and caulking projections.

Thus, it has been adopted to use the caulking means as a final caulking.

However, in case the materials are once laminated and then punched out, since punching is done especially on a plurality of layered materials of high brittleness, it is difficult to stably form caulking projections through to the lower layers of the amorphous laminated sheets, as a result of which sufficient caulking strength is not effected.

In addition, the lamination formed core is weak in caulking strength and there is thus a problem of the core breaking.

Further, there is a problem that micro cores, as for pocket telephones, could not be produced from the amorphous thin sheet material.

SUMMARY OF INVENTION

Accordingly, it is an object of the invention to solve existing problems involved with the production of laminated cores using amorphous substances, and to provide an amorphous laminated core, and a method of making an amorphous laminated core having sufficient caulking strength and core shaping precision even if the amorphous laminated core has a small size suitable for pocket telephones.

The method according to the invention is set forth in exemplary forms in (1) to (6), below.

(1) The method includes the steps of:
laminating plural sheets of core pieces having caulking through-holes formed by punching,
inserting rod shaped materials into the caulking through-holes of the laminated core pieces, and
pushing back the inserted rod materials,
thereby to caulk the core pieces of the plurality of laminated sheets.

(2) The method uses rod material inserted in the caulking through-hole that is non-magnetic.

(3) The method uses rod material inserted in the caulking through-holes that have an outer circumference with a rough surface or grooves perpendicular with a length thereof.

(4) With the amorphous laminated core made by punching core pieces from amorphous thin sheet material and laminating the plural sheets of core pieces, the non-magnetic rod materials are fitted in the caulking through-holes of the laminated core pieces.

(5) With the amorphous laminated core made by punching core pieces from amorphous thin sheet material and laminating the plural sheets of the core pieces, the rod materials: are inserted in the caulking through-holes of the laminated core pieces; are non-magnetic; and are formed on an outer circumference with a rough surface or grooves perpendicular to their length.

(6) A plurality of caulking through-holes may be formed on inner circumferential sides and outer circumferential sides of wiring slots defined in the amorphous laminated core.

In accordance with (1), the inserted rod materials fit with burrs or bent-deformed parts generated on the punched edges of the caulking through-holes.

When the inserted rod materials are pushed back, they are more firmly fitted in the caulking through-holes to accurately maintain a desired laminated core shape.

In accordance with (2), magnetic insularity can be secured between the laminated core pieces, and also in this regard, iron loss may be reduced.

In accordance with (3), the frictional holding forces at the inner face of the caulking through-holes is enhanced to increase the caulking strength.

In accordance with (4), the laminated core pieces are unified with a sufficient caulking strength without causing cracks in caulked parts.

In accordance with (5), the rod materials are fitted with the inner circumference of the caulking through-holes, and magnetic insularity can be secured between the laminated core pieces. Iron loss may be reduced.

In accordance with (6), an excellent amorphous laminated core for rotors may be realized.

BRIEF DESCRIPTION OF DRAWINGS

FIGS. 3, 3(A) and 3(B) are views showing the caulked conditions of the laminated core pieces.

BEST MODE FOR CARRYING OUT THE INVENTION

Figure 1:
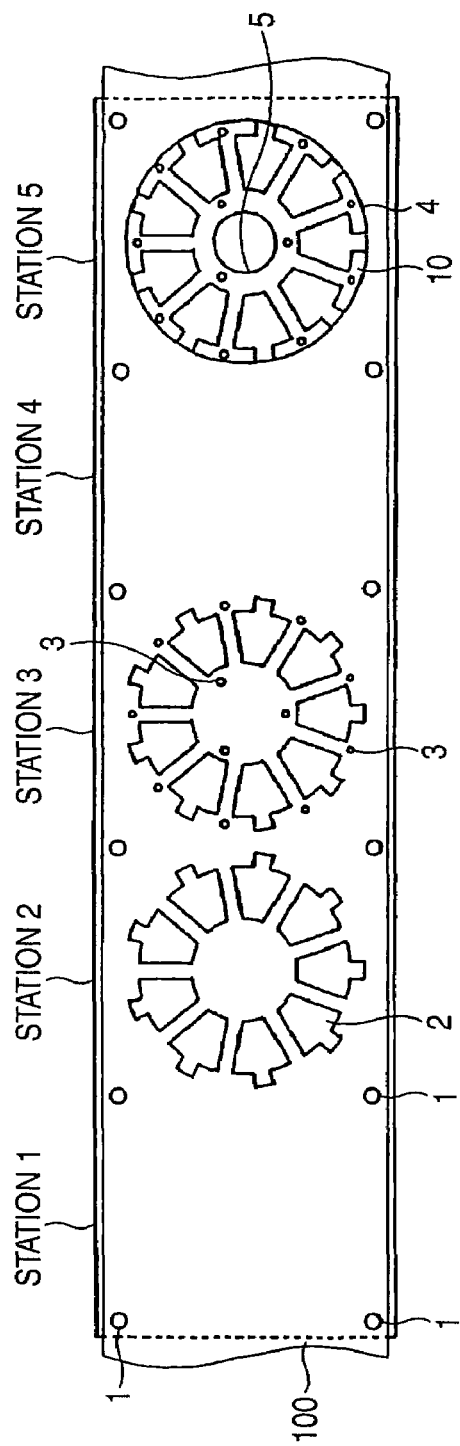
FIG. 1 is a view showing a process of punching the core pieces from the amorphous thin sheet material.

FIG. 1 depicts a process of punching core pieces 10 from an amorphous thin sheet material, showing a punching and forming order of the laminated core at different stations of a forming apparatus.

Referring to FIG. 1, at a station 1, for punching the core pieces from amorphous thin sheet material 100, guide holes 1 functioning to facilitate consistent positioning at the respective stations are punched separately in width and length directions of the amorphous thin sheet material 100.

At station 2, the material is punched circumferentially to form a desired number of wiring slots 2 (in the instant embodiment, nine in number).

The number or shapes of the wiring slots 2 may be modified as needed, not being limited to this embodiment.

At station 3, the caulking through-holes 3 are respectively punched in an inner circumferential side and an outer circumferential side of the wiring slots 2 formed at the station 2.

The caulking through-hole 3 is round in this embodiment, but may be rectangular, polygonal or oval.

A station 4 is provided for idle.

At station 5, the sheet 100 is punched to define outer shapes 4 as to include the caulking through-holes 3 formed in the station 3, as well as an inner shape 5 through a die (not shown), and laminates to form the laminated core component 11.

The above explanation with respect to FIG. 1 refers to the order of processing the core pieces from the amorphous thin sheet material at station 1 to the form at station 5, including forming the guide holes 1, the wiring slots 2, the caulking through-holes 3, the outer shapes 4 and the inner shape 5. The punching order is not limited to that described, however.

Figure 2:
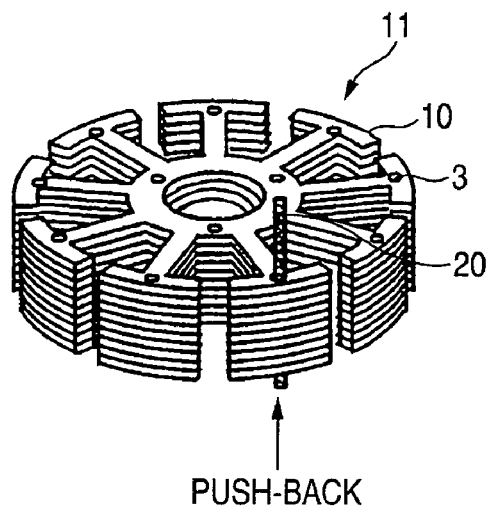
FIG. 2 is a view showing the core produced by laminating the core pieces.

FIG. 2 shows a core component produced by laminating the core pieces 10.

As shown in FIG. 2, the core pieces 10 produced in the station 5 of FIG. 1 are, of course, laminated in such a manner that the caulking through-holes 3 of the respective core pieces 10 are uniform and aligned in the vertical directions.

The rod materials 20 made of the non-magnetic substance (for example, stainless steel or synthetic resin) are inserted into the caulking through-holes 3 into and through the upper parts of the case component and thereafter to and through the bottom of the core component. The inserted rod materials 20 are then pushed back in the direction of the arrow at the bottom of the core component, so that the laminated cores are caulked.

At a time of accomplishing the caulking, the rod materials are cut off where they project from the upper and lower parts of the caulking through-holes of the laminated core so that there is no appreciable projection thereof at the top or bottom of the core component.

Figure 3:
Figure 3:
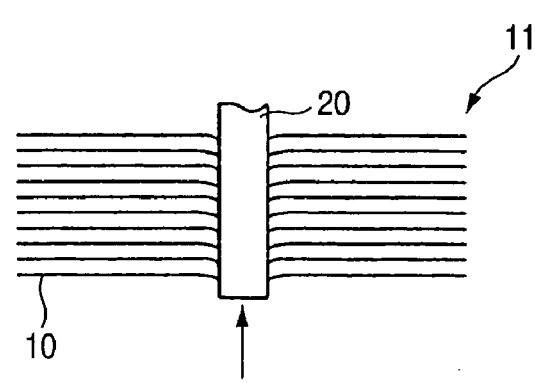

FIG. 3 shows the conditions of caulking the laminated core pieces.

As seen in FIG. 3A, when the caulking through-holes 3 are punched from the amorphous thin sheet material, since the amorphous materials are brittle and lack workability, the punched caulking through-holes 3 have burrs and/or bent-deformed parts on the punched edges around the through-holes 3.

The burrs and/or bent-deformed parts on the punched edges are larger in the amorphous thin sheet material than those of thin iron sheets, such as electromagnetic steel sheets.

With respect to the laminated core piece 11, as seen in FIG. 3B, the rod materials 20 are inserted into the caulking through-holes 3, and thereafter the inserted rod materials 20 are pushed back at the lower parts of the caulking through-holes, whereby the fitting degree/connection increases/is enhanced between the punched and deformed parts (burrs or bent parts) of the punched edges and the rod materials 20, so that the amorphous strength accordingly increases. Frictional connection between the rod materials 20 and the laminated core pieces, including within the through-holes, thus maintains the core pieces together.

As is seen, since the caulking strength can be increased, the laminated core pieces 11 are consistently maintained in a desired shape.

This effect is exhibited similarly, irrespective of whether the laminated core 11 is small or large in size.

In the embodiments, the explanation has been made with respect to the rotor core. The same may be applied to a stator core, or a laminated core of a transformer.

The above explanation has been made in that the core pieces are punched one by one from the amorphous thin sheet material, and for caulking the plural core pieces. The same method may be practiced using plural laminated amorphous thin sheet materials.

To further enhance holding of the core pieces, the rod materials 20 may be made with rough surfaces or grooves 40, as shown in FIG. 2, said rough surface or grooves being perpendicular to the length of the rod.

INDUSTRIAL APPLICABILITY

The method of making the amorphous laminated core of the invention involves, in one form, the steps of laminating the plural sheets of the core pieces having the caulking through-holes formed by punching, inserting rod shaped materials into the caulking through-holes of the laminated core pieces, and thereafter pushing back the inserted rod materials, thereby to caulk the core pieces of the plurality of laminated sheets, whereby the rod shaped materials firmly fit with the caulking though-holes and increase the caulking strength.

As a result, the core shapes in transverse directions can be maintained since the punched forms defining the caulking parts are only the through-holes, the hole sizes may be made very small, enabling the construction of relatively small amorphous laminated cores.

For punching the amorphous thin sheet, it is unnecessary to punch any inserting projections for caulking, so that there may be no breakage owing to brittleness of the amorphous material itself with effects of increasing forming yield.

The invention is not limited to the above mentioned, specific embodiments.

The invention claimed is:

1. A method of manufacturing a laminated core, the method comprising the steps of:
    punching a plurality of core pieces from thin sheet material;
    forming caulking through-holes in the plurality of core pieces;
    laminating the plurality of core pieces to define a core component having a top and bottom and so that the caulking through-holes in the plurality of core pieces are aligned at one location, fully through the core component;
    inserting a first rod shaped material into the caulking through-holes of the core pieces at the first location by movement of the first rod shaped material in a first direction from the top/bottom of the core component fully to and through the bottom/top of the core component; and
    after inserting the first rod shaped material, pushing back the inserted first rod shaped material by movement of the rod shaped material through the caulking through-holes in a direction, with no forces being applied to either end of the rod in the first direction so as to deform the rod, opposite to the first direction to thereby enhance connection between the first rod shaped material and core pieces and thereby form the laminated core.

2. The method of making a laminated core as set forth in claim 1, wherein the sheet material is an amorphous material and the first rod shaped material inserted in the caulking through-holes is non-magnetic.

3. The method of making a laminated core as set forth in claim 1 or 2, wherein the first rod shaped material has a length and an outer circumference with a rough surface or grooves perpendicular to the length to engage and reposition burrs and/or bent-deformed parts developed on the core pieces as the through-holes are formed, as the rod shaped material is directed through the through-holes.

4. The amorphous laminated core as set forth in claim 1 wherein there is at least a second rod shaped material that is inserted into and pushed back in the core component at a second location in the same manner that the first rod shaped material is inserted into and pushed back in the core component.

* * * * *